United States Patent
Er et al.

(10) Patent No.: US 12,526,162 B2
(45) Date of Patent: Jan. 13, 2026

(54) SECURE MODULE AND METHOD FOR APP-TO-APP MUTUAL TRUST THROUGH APP-BASED IDENTITY

(71) Applicant: V-Key Inc., Grand Cayman (KY)

(72) Inventors: Chiang Kai Er, Singapore (SG); Hoang Vinh Tran, Singapore (SG)

(73) Assignee: V-Key Inc., Grand Cayman (KY)

( * ) Notice: Subject to any disclaimer, the term of this patent is extended or adjusted under 35 U.S.C. 154(b) by 372 days.

(21) Appl. No.: 18/276,490

(22) PCT Filed: Feb. 8, 2022

(86) PCT No.: PCT/SG2022/050063
§ 371 (c)(1),
(2) Date: Aug. 9, 2023

(87) PCT Pub. No.: WO2022/173373
PCT Pub. Date: Aug. 18, 2022

(65) Prior Publication Data
US 2024/0113898 A1    Apr. 4, 2024

(30) Foreign Application Priority Data
Feb. 10, 2021    (SG) .......................... 10202101434Y

(51) Int. Cl.
*H04L 9/32*    (2006.01)
*G06F 21/53*    (2013.01)
(Continued)

(52) U.S. Cl.
CPC ............ *H04L 9/3273* (2013.01); *G06F 21/53* (2013.01); *G06F 21/64* (2013.01); *H04L 9/0643* (2013.01);
(Continued)

(58) Field of Classification Search
CPC ... H04L 9/3273; H04L 9/0643; H04L 9/3247; H04L 9/3265; G06F 21/53; G06F 21/64
(Continued)

(56) References Cited

U.S. PATENT DOCUMENTS 10,798,077 B1    10/2020  Pratt et al.
10,853,494 B2 *  12/2020  Subramanian .......... G06F 21/51
(Continued)

FOREIGN PATENT DOCUMENTS

CN    107247902 A    10/2017
CN    112202710 A    1/2021

OTHER PUBLICATIONS

International Search Report of the International Searching Authority mailed on May 24, 2022, issued in connection with International Application No. PCT/SG2022/050063 (4 pages).
Written Opinion of the International Searching Authority mailed on May 24, 2022, issued in connection with International Application No. PCT/SG2022/050063 (4 pages).

*Primary Examiner* — Samson B Lemma
(74) *Attorney, Agent, or Firm* — McCarter & English, LLP

(57) ABSTRACT

This document discloses a module and method for establishing application-to-application (app-to-app) mutual trust so that exchange of information and data between applications takes place in a secure manner. This document discloses a secure module that comprises an identification and trusted-storage modules. The identification module is configured to establish a cryptographic bond between an application provided within a standard operating system of a computing device and the secure module. Secure communication may then be established between the application and the secure module. The application may then make use of the cryptographic keys in the secure module to establish secure communications with other applications. The integrity of the application is authenticated based on the crypto-
(Continued)

graphic bond and information contained in the trusted-storage module. The application may then proceed to process an action as an authenticated application bearing a set of trust attributes issued by a trusted third party.

18 Claims, 5 Drawing Sheets

(51) Int. Cl.
    *G06F 21/64*     (2013.01)
    *H04L 9/06*     (2006.01)

(52) U.S. Cl.
    CPC .......... *H04L 9/3247* (2013.01); *H04L 9/3265* (2013.01); *G06F 2221/033* (2013.01)

(58) Field of Classification Search
    USPC .......................................................... 713/157
    See application file for complete search history.

(56) References Cited

U.S. PATENT DOCUMENTS

| | | | |
|---|---|---|---|
| 2003/0037237 A1* | 2/2003 | Abgrall | H04L 63/062 713/166 |
| 2004/0039924 A1* | 2/2004 | Baldwin | H04L 9/0891 713/189 |
| 2015/0200934 A1* | 7/2015 | Naguib | H04L 9/3247 713/168 |
| 2017/0270319 A1* | 9/2017 | Salmon-Legagneur | G06F 21/51 |
| 2019/0121962 A1 | 4/2019 | Coleman et al. | |
| 2019/0312734 A1* | 10/2019 | Wentz | H04L 9/3239 |
| 2020/0026857 A1* | 1/2020 | Muller | G06F 21/12 |
| 2020/0026858 A1* | 1/2020 | Subramanian | G06F 21/64 |
| 2020/0195660 A1* | 6/2020 | McIver | H04L 9/14 |
| 2020/0293698 A1* | 9/2020 | Sion | H04L 9/0844 |
| 2020/0404023 A1 | 12/2020 | Zhu et al. | |
| 2022/0123948 A1* | 4/2022 | Wentz | H04L 9/3234 |

\* cited by examiner

SECURE MODULE AND METHOD FOR APP-TO-APP MUTUAL TRUST THROUGH APP-BASED IDENTITY

RELATED APPLICATIONS

This application is a U.S. National Phase Application under 35 U.S.C. 371 of International Application No. PCT/SG2022/050063 filed Feb. 8, 2022, which claims the benefit of Singapore Patent Application No. 10202101434Y filed on Feb. 10, 2021. The disclosures of these applications are expressly incorporated herein by reference in their entireties.

FIELD OF THE INVENTION

This invention relates to a module and method for establishing application-to-application (app-to-app) mutual trust so that exchange of information and data between these applications may take place in a secure manner. In particular, this invention relates to a module that comprises an identification module and a trusted-storage module. The identification module is configured to establish a cryptographic bond between an application provided within a standard operating system of a computing device and the secure module. Once this is done, secure communication may then be established between the application and the secure module. The application may then subsequently make use of the cryptographic keys in the secure module to establish secure communications with other applications. The integrity of the application is then authenticated based on the cryptographic bond and information contained in the trusted-storage module. The application may then proceed to process an action as an authenticated application bearing a set of trust attributes issued by a trusted third party.

SUMMARY OF PRIOR ART

Currently, a secure element or a Trusted Execution Environment (TEE) is generally used in computing devices to execute logic and operations (especially cryptographic operations) that need to be protected from the normal operating environment of applications (apps) that make use of them. Apps typically treat the secure element or TEE as a separate computing module that can assist in providing trusted storage or cryptography services. As such, most computing devices that utilize a secure element or TEE would provide it as a common resource that is shared among all the apps that are running in the normal operating system of the computing device. In such systems, access control to the secure element or TEE is usually enforced by the operating system. If the operating system is compromised, or if the app has been tampered with, the secure element or TEE would not have any knowledge of it and it may be misused, leading to what is known as a "trust gap" issue.

Additionally, as apps evolve to become more complex and collaborative, there is an increasing need for apps to communicate securely with one another. In particular, these apps need to have a way to establish mutual trust between them before a secure communication channel can be established between the apps. This is especially relevant to apps that depend on other apps for user authentication, payment, and secure data transfer for trusted storage or processing. Some of these apps may even be running in untrusted operating environments, such as end-users' personal devices. Normally, when an app needs to trust another app, it would have to determine if the other app is what it is supposed to be talking to, has not been tampered with (both statically and dynamically), and once this is done, whether the app can establish a trusted communication channel between the apps.

Such precautions are important as malicious third parties may attempt to modify an app running on a computing device so that it does not operate as it is supposed to. For example, an app may only allow certain functions of the app to be used by the user once an associated license has been purchased. Malicious third parties may modify the app so that all of the app's functions may be accessed by the user of the device thereby circumventing the need to purchase the license. As another example, an app may be configured as a secure app to provide payment authorization when requested by external payment systems. Malicious third parties may modify this app so that the authorizations are not seen by the user of the computing device and the authorizations may be directly sent to data servers associated with bad actors instead.

For the above reasons, those skilled in the art are constantly striving to come up with a module and method that is capable of ensuring that an app has not been tampered with and once authenticated, to use the authenticated app to establish secure communications with other apps.

SUMMARY OF THE INVENTION

The above and other problems are solved and an advance in the art is made by systems and methods provided by embodiments in accordance with the invention.

A first advantage of embodiments of modules and methods in accordance with the invention is that the secure module of the invention is cryptographically bound to an application such that the secure module is able to statically and/or dynamically verify that the application has not been tampered with.

A second advantage of embodiments of modules and methods in accordance with the invention is that once the integrity of the application has been statically and/or dynamically verified by the secure module, the secure module is then configured to process actions associated with the authenticated application such that the processed actions are able to attest for the application's identity.

A third advantage of embodiments of systems and methods in accordance with the invention is that other applications or secure modules/TEEs within the computing device or in different computing devices may then utilize the authenticated application to perform user authentication processes, or to establish secure communication channels between the secure modules/TEEs and the authenticated application.

A fourth advantage of embodiments of systems and methods in accordance with the invention is that two applications that may not be aware of each other can establish mutual trust by checking that the other application's trust attributes meet the requirements for the intended action, and verifying that the trust attributes belong to the application.

A fifth advantage of embodiments of systems and methods in accordance with the invention is that mutual trust is established end-to-end between two applications, and this is independent of the underlying operating systems, hardware, or communication channels. Even if the operating systems, hardware, or communication channels are compromised, the two applications can still directly trust each other's integrity.

A sixth advantage of embodiments of systems and methods in accordance with the invention is that the system can be fully implemented in software, without any special requirements in the underlying operating system or hardware. This makes it easily applicable to any kind of application endpoint.

The above advantages are provided by embodiments of a method in accordance with the invention operating in the following manner.

According to a first aspect of the invention, a secure module for attesting an authenticity of an application that is provided within a standard operating system of a computing device is disclosed, the module comprising an identification module configured to: establish a first cryptographic bond between the application and the secure module when communication is established between the application and the secure module, whereby the first cryptographic bond is generated based on information associated with the application as preloaded in the secure module and on information obtained from the application; authenticate an integrity of the application based on the first cryptographic bond; and process an action for the authenticated application.

With regard to the first aspect of the invention, the identification module is further configured to dynamically re-authenticate the integrity of the authenticated application based on a second cryptographic bond, wherein the second cryptographic bond is generated based on the information associated with the application as preloaded in the secure module and on information newly obtained from the application.

With regard to the first aspect of the invention, the secure module further comprises: a non-transitory media readable by a processing unit to store instructions for directing the processing unit to: provide a cryptographic sandbox that includes a virtual cryptographic machine that performs cryptographic operations including decrypting virtual machine codes, and a tamper-proof virtual layer within the cryptographic sandbox to protect cryptographic operations from unauthorized observers.

With regard to the first aspect of the invention, the establishing of the first cryptographic bond between the application and the secure module by the identification module comprises: the identification module being configured to: receive an app-checksum from the application, wherein the app-checksum is derived from the application based on the application's source code, the application's binary and/or the application's programming flow; retrieve a trusted-checksum associated with the application from a trusted-storage module provided in the secure module; and generate the first cryptographic bond based on the app-checksum received from the application and the retrieved trusted-checksum.

With regard to the first aspect of the invention, the generation of the app-checksum by the application comprises the application being configured to utilize a SHA-256 hash function to hash the source code of the application to generate the app-checksum.

With regard to the first aspect of the invention, the establishing of the first cryptographic bond between the application and the secure module by the identification module comprises: the identification module being configured to: receive from the application a digital signature associated with the application, wherein the digital signature is generated when the application's source code is signed using a private key unique to the application each time the application's source code is compiled; retrieve a trusted-public key associated with the application from a trusted-storage module provided in the secure module; and generate the first cryptographic bond based on the digital signature received from the application and the retrieved trusted-public key associated with the application.

With regard to the first aspect of the invention, the identification module is further configured to: receive an app-checksum from the application, wherein the app-checksum is derived from the application based on the application's source code; retrieve a trusted-checksum associated with the application from a trusted-storage module provided in the secure module; and re-generate the first cryptographic bond based on the app-checksum received from the application, the retrieved trusted-checksum, the received digital signature and the retrieved trusted-public key.

With regard to the first aspect of the invention, the authentication of the integrity of the application based on the first cryptographic bond by the identification node comprises the identification node being configured to authenticate the integrity of the application when it is determined from the cryptographic bond that information obtained from the application matches with the information associated with the application as preloaded in the secure module.

With regard to the first aspect of the invention, the processing of the action for the authenticated application by the identification module comprises: the identification module being configured to: sign, using a cryptographic key-signing algorithm, the action using a private key unique to the application; and communicate the signed action and a retrieved certificate chain to another application, whereby upon receiving the signed action and the certificate chain, the another application is configured to verify the signed action based on the received certificate chain.

With regard to the first aspect of the invention, the action comprises a request signed by another application and a certificate chain, whereby the processing of the action for the authenticated application by the identification module comprises: the identification module being configured to: verify the signed request based on the certificate chain; execute instructions contained within the request when it is determined that the signed request has been verified; construct a response based on an outcome of the executed instructions; sign the response using a private key unique to the application; encrypt the signed response and communicate the encrypted signed response to the another application.

With regard to the first aspect of the invention, the processing of the action for the authenticated application by the identification module comprises: the identification module being configured to: retrieve a trust attribute from a trusted-storage module provided within the secure module based on requirements of the action, and where the trust attribute is signed by a trusted third party that has certified that the application is qualified to be given the attribute; generate a response based on the retrieved trust attribute; and send the generated response to another application, wherein upon receiving the generated response, the another application is configured to use the trust attribute contained within the response to perform a secure transaction.

According to a second aspect of the invention, a system for establishing, using the secure module according to the first aspect of the invention, mutual trust between a first computing-application and a second computing-application that are provided within a standard operating system of a user's computing device is disclosed, wherein the application comprises the first computing-application, and whereby the secure module is communicatively connected to the first computing-application, the system comprising: the second computing-application being configured to send an authentication request to the first computing-application; the first computing-application being configured to: authenticate, using the secure module, the first computing-application when the authentication request from the second computing-application is received by the first computing-application; generate a verification response when the first computing-application has been authenticated by the secure module; and send the verification response to the second computing-application, wherein the second computing-application is configured to use the verification response to establish the mutual trust between the first and second computing-applications.

With regard to the second aspect of the invention, the second computing-application is configured to: share secure data with the first computing-application when the second computing-application determines from the received verification response that the first computing-application has been authenticated.

According to a third aspect of the invention, a system for establishing, using the secure module according to the first aspect of the invention, mutual trust between a third computing-application and a trust element bound to a user's computing device, the third computing-application being provided within a standard operating system of the user's computing device is disclosed, wherein the application comprises the third computing-application, and whereby the secure module is communicatively connected to the third computing-application, the system comprising: the trust element being configured to send an authentication request to the third computing-application; the third computing-application being configured to: authenticate, using the secure module, the third computing-application when the authentication request from the trust element is received by the third computing-application; generate a verification response when the third computing-application has been authenticated by the secure module; and send the verification response to the trust element, wherein the trust element is configured to use the verification response to establish the mutual trust between the third computing-application and the trust element.

According to a fourth aspect of the invention, a system for establishing, using the secure module according to the first aspect of the invention, mutual trust between a fourth computing-application and a fifth computing-application, the fourth computing-application being provided within a standard operating system of the user's computing device, wherein the application comprises the fourth computing-application, and whereby the secure module is communicatively connected to the fourth computing-application, the system comprising: the fifth computing-application being configured to send an authentication request to the fourth computing-application; the fourth computing-application being configured to: authenticate, using the secure module, the fourth computing-application when the authentication request from the fifth computing-application is received by the fourth computing-application; generate a verification response when the fourth computing-application has been authenticated by the secure module; and send the verification response to the fifth computing-application, wherein the fifth computing-application is configured to use the verification response to establish the mutual trust between the fourth computing-application and the fifth computing-application.

According to a fifth aspect of the invention, a method for attesting an authenticity of an application provided within a standard operating system of a computing device is disclosed, the method comprising the steps of: establishing, using a secure module, a first cryptographic bond between the application and the secure module when communication is established between the application and the secure module, whereby the first cryptographic bond is generated based on information associated with the application as preloaded in the secure module and on information obtained from the application; authenticating, using the secure module, an integrity of the application based on the first cryptographic bond; and processing, using the secure module, an action for the authenticated application.

With regard to the fifth aspect of the invention, the method further comprises the step of: dynamically re-authenticating, using the secure module, the integrity of the authenticated application based on a second cryptographic bond, wherein the second cryptographic bond is generated based on the information associated with the application as preloaded in the secure module and on information newly obtained from the application.

With regard to the fifth aspect of the invention, the secure module comprises: a non-transitory media readable by a processing unit to store instructions for directing the processing unit to: provide a cryptographic sandbox that includes a virtual cryptographic machine that performs cryptographic operations including decrypting virtual machine codes, and a tamper-proof virtual layer within the cryptographic sandbox to protect cryptographic operations from unauthorized observers.

With regard to the fifth aspect of the invention, the step of establishing the first cryptographic bond between the application and the secure module comprises the steps of: receiving, using the secure module, an app-checksum from the application, wherein the app-checksum is derived from the application based on the application's source code, the application's binary and/or the application's programming flow; retrieving, using the secure module, a trusted-checksum associated with the application from a trusted-storage module provided in the secure module; and generating, using the secure module, the first cryptographic bond based on the app-checksum received from the application and the retrieved trusted-checksum.

With regard to the fifth aspect of the invention, the generation of the app-checksum by the application comprises the application being configured to utilize a SHA-256 hash function to hash the source code of the application to generate the app-checksum.

BRIEF DESCRIPTION OF THE DRAWINGS

The above and other problems are solved by features and advantages of a system and method in accordance with the present invention described in the detailed description and shown in the following drawings.

DETAILED DESCRIPTION

Figure 1:
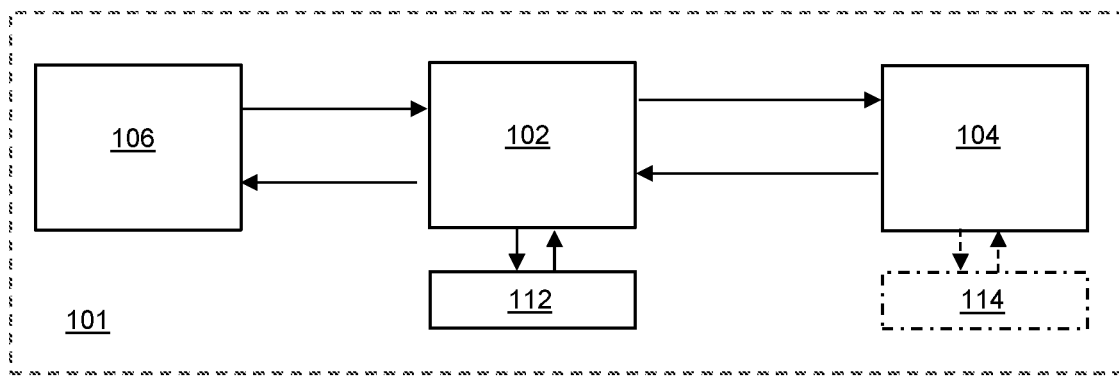
FIG. 1 illustrating a block diagram showing how mutual trust may be established between two applications through the use of a secure module configured in accordance with embodiments of the invention.

This invention relates to a module and method for establishing application-to-application (app-to-app) mutual trust so that exchange of information and data between these applications may take place in a secure manner. In particular, this invention relates to a secure module that comprises an identification module and a trusted-storage module. The identification module is configured to establish a cryptographic bond between an application provided within a standard operating system of a computing device and the secure module. Once this is done, secure communication may then be established between the application and the secure module. The application may then subsequently make use of the cryptographic keys in the secure module to establish secure communications with other applications. The integrity of the application is then authenticated based on the cryptographic bond and on information contained in the trusted-storage module. The application may then proceed to process an action as an authenticated application bearing a set of trust attributes issued by a trusted third party.

The present invention will now be described in detail with reference to several embodiments thereof as illustrated in the accompanying drawings. In the following description, numerous specific features are set forth in order to provide a thorough understanding of the embodiments of the present invention. It will be apparent, however, to one skilled in the art, that embodiments may be realised without some or all of the specific features. Such embodiments should also fall within the scope of the current invention. Further, certain process steps and/or structures in the following may not have been described in detail and the reader will be referred to a corresponding citation so as to not obscure the present invention unnecessarily.

Further, one skilled in the art will recognize that many functional units in this description have been labelled as modules throughout the specification. The person skilled in the art will also recognize that a module may be implemented as circuits, logic chips or any sort of discrete component. Still further, one skilled in the art will also recognize that a module may be implemented in software which may then be executed by a variety of processors. In embodiments of the invention, a module may also comprise computer instructions or executable code that may instruct a computer processor to carry out a sequence of events based on instructions received. The choice of the implementation of the modules is left as a design choice to a person skilled in the art and does not limit the scope of this invention in any way.

Still further, it should be noted that the following description will focus on an embodiment in accordance with the present invention, which is typically operative in an environment providing application Software running under Apple iOS® or Google Android® operating systems. However, embodiments in accordance with this invention are not limited to any one particular application or any particular environment. Indeed, those skilled in the art will find that the systems and methods of the present invention may be advantageously applied to a variety of system and application Software, including security tokens, Software cryptography, network encryption, and Internet of Things (IoT). Moreover, embodiments in accordance with the present invention may be performed in a variety of different platforms, including other mobile phone operating systems such as RIM Blackberry®, Microsoft® Windows Phone, and the like, other operating systems such as Apple Mac OS®, Microsoft® Windows, Linux, UNIX, FreeRTOS, and other operating environments such as web browsers and embedded devices, and the like. Therefore, the description of the shown embodiment in accordance with the present invention that follows is for purposes of illustration and not limitation. The processes for providing methods and systems in accordance with this invention may be executed by a device, such as, but not limited to a mobile telephone, tablet, netbook, laptop, server, or other processing system.

FIG. 1 illustrates a block diagram showing how mutual trust may be established between application 102 and application 104, and between trust element 106 and application 102 through the use of secure module 112 and optionally through the additional use of secure module 114 in accordance with embodiments of the invention. One skilled in the art will recognize that applications 102 and 104 may comprise, but are not limited to, a mobile application (mobile app/an app), a computing application, a computer program or a software application that is designed to run on a standard operating system 101 of a computing device such as a smartphone, computer tablet, or any other type of mobile computing device. In other embodiments of the invention, applications 102 and 104 may be running on separate and/or different types of operating systems and/or that trust element 106 may be provided within an independent computing device or may reside in another type of operating system as well.

Nowadays, such applications are capable of performing various functions such as providing: location based services; payment or banking services; gaming functions; order tracking and etc. Regardless of the function performed by the application, most applications typically require network access to function properly. Generally, it is widely accepted that applications may be broadly classified into a few main types. The first type comprises web-based applications that are executed through a web-browser, the second type comprises a native application that is designed specifically for a particular type of operating system, the third type comprises a hybrid application that is built using web-based languages such as HTML and JavaScript but is executable by various operating systems, and the fourth type comprises IoT devices and remote secure elements, i.e. applications that are running on separate computing devices. Applications 102 and 104 may comprise any one of these types of applications without departing from the invention.

In accordance with embodiments of the invention, secure module 112 is cryptographically bound to application 102. In particular, secure module 112 is configured to establish a cryptographic bond with application 102 when communication is established between them. This cryptographic bond is then used by secure module 112 to authenticate the integrity of application 102.

In embodiments of the invention, the cryptographic bond may be generated based on information associated with application 102, such as, but not limited to, a unique key associated with application 102, a checksum generated based on the source code, the application's binary (i.e. its compiled source code) or programming flow of application 102, a hash of the source code, the application's binary (i.e. its compiled source code) or programming flow of application 102 (e.g. using a hash function such as the SHA-256 hash function), application 102's application-identity which comprise of application 102's package name, bundle identity, etc., application 102's signing certificate digest (in the case of signed applications) or application 102's checksum (in the case of apps that may not be signed), private-public keys and etc. During the initial setup phase, all this information and/or data associated with application 102 may be provided and stored in a secure location within secure module 112.

This creates a strong bond between the application 102 and the secure module 112. When application 102 and secure module 112 are communicatively connected, these values embedded within secure module 112 will be used with the actual values retrieved from application 102 to generate the cryptographic bond. This bond is then used to determine if application 102 has been tampered with or not.

For example, a malicious third party may un-package and reverse engineer application 102 to modify its source code or to inject malicious code. This malicious action would be detected by secure module 102 as any modifications made to the source code of application 102 would cause its checksum to be altered. As such, when the cryptographic bond is generated by secure module 112 based on the checksum generated by application 102 and the information embedded within secure module 112, module 112 would be able to determine that application 102 has been tampered with.

Alternatively, the malicious source code in application 102 may be detected when the altered source code is compiled. This is because each time application 102 is compiled, application 102 is configured to generate a digital signature by signing application 102's compiled source code with a private key unique to application 102.

During the initial setup phase, once application 102's developer has compiled the source code for application 102, the developer will then sign the compiled source code using a private key unique to application 102. This digital signature is then attached to application 102 as a trusted-digital signature unique to application 102. The trusted public key used to verify the digital signature for application 102 will be stored within secure module 112. For completeness, it should be noted that a digital signature is created when data is signed using a private key (which is part of a private-public key pair). A corresponding public key then has to be used to verify the veracity of the digital signature. The signing and verification processes are based on standard private-public key cryptography. It should also be noted that each time a particular data is signed using a particular private key, the resulting digital signature will always be different even though the same signing operation is carried out. Therefore, the trusted public key is stored within the secure module so that it may be used by the secure module to validate the veracity of the digital signature.

As such, when a malicious third party modifies the source code of application 102, the digital signature generated by application 102 based on the altered compiled source code will not be verified successfully as the malicious third party would not have access to application 102's unique private key and would instead have to generate the digital signature using its own private key. Hence, when the cryptographic bond is generated by secure module 112 based on the digital signature generated based on the altered compiled source code of application 102, and the trusted-public key stored in secure module 112, module 112 would be able to determine that application 102 has been tampered with.

In another scenario, when a malicious third party hooks on a function of application 102, it might modify the code segment of application 102 statically or dynamically, or the malicious function might appear in the call trace during the runtime. The former can be prevented by checking the checksum or verifying the digital signature as described in the previous sections. The latter can be detected by comparing against either a whitelist or a blacklist. Both lists are encrypted and stored in secure module 112, together with their corresponding encryption keys.

In a further embodiment of the invention, the developer of application 102 may provide an application signing certificate digest or the application's checksum (which can be calculated using a digest algorithm such as SHA-256) that is stored as a value in an encrypted asset file within secure module 112, together with its corresponding encryption key. When communication is initially established between application 102 and secure module 112, module 112 may be configured to decrypt this pre-stored asset file, retrieve the value and compare the value against the one retrieved from application 102 to determine whether application 102 has been tampered or altered. This may be done directly, through the generation of a cryptographic bond as described in the previous sections or concurrently as the cryptographic bond is generated.

In a further embodiment of the invention, application 102's identity keys, certificates and trust lists may be generated by and stored inside a trusted and physically secure system (which can be implemented using a hardware security module) in one security endpoint. These assets are also embedded in secure module 112, which constitutes the other security endpoint, using a secure build process. Split knowledge and dual control are strictly enforced during the whole process. For example, at least two operators from different departments are required to be able to access to the hardware security module and perform the build process. Each operator keeps a set of the split passwords, and the passwords will be changed immediately after each generation process. Each set of the split passwords is then kept securely in each different safe. The keys for each safe are handled by different authorized personnel.

In still further embodiments of the invention, secure module 112 may dynamically cause another cryptographic bond to be generated between secure module 112 and application 102 during the runtime of application 102. This other bond may be generated based on a random schedule or fixed schedule and it will be generated based on the information associated with the application as preloaded in the secure module and on information newly obtained from the application. This is to ensure that the integrity of application 102 is continuously authenticated, thereby validating the soundness of data/information contained within application 102. The cryptographic bond may comprise the application's checksum or digital signature as described in the previous sections. The cryptographic bond can then be checked as described in the previous sections.

In embodiments of the invention, each time application 102 receives a request to share private data/information, application 102 may be configured to invoke secure module 112, and cause secure module 112 to perform a series of security checks to ensure that application 102 has not been tampered. Only when application 102 has been authenticated by secure module 112, application 102 may then share its private data/information with other applications or trusted third parties.

Once secure module 112 has confirmed the integrity, identity and authenticity of application 102, i.e. that application 102 has not been tampered with, secure module 112 will then allow application 102's private information, such as, but is not limited to, the application's identity keys, the application user's identity, private keys, digital certificates, trust attributes (which are attributes of the application as attested by a trusted third-party that indicate the application's trustworthiness in different aspects, such as secure user authentication, data privacy, and regulatory compliance) and etc. which are stored in secure module, to be accessed by application 102 and/or for application 102 to share this information with other applications communicatively connected to application 102. For example, once authenticated, application 102's identity keys may then be used for data signing or secure key exchange processes, and the corresponding digital signatures of its keys may be provided to other applications, e.g. application 104, for verification purposes.

It should be noted that application 102's private information allows application 102 to have an identity that is independent of the device user's identity or the computing device's identity. Hence, once application 102's integrity has been authenticated, application 102 may then use its private information to in turn separately authenticate a user of the application so that the user may securely exchange information with independent trusted third-parties or applications.

For example, application 104 may send an authentication request to application 102, requesting that application 102 authenticates itself using secure module 112 as described above so that the user associated with application 102 may in turn be authenticated as well. In another example, a trusted element 106 such as a secure element or a Trust Execution Environment (TEE) which is bound to the computing device, may send an authentication request to application 102 requesting that application 102 authenticates itself using secure module 112 as described above. Trusted element 106 has to do this as trusted element 106 is unable to verify whether application 102 has been tampered with. Once the integrity of application 102 has been authenticated, trusted element 106 may then make use of the application's private information, e.g. the application user's identity or trust attributes, to establish a trusted communication channel between the trusted element and the application. In yet another example, most servers would contain private keys and certificates that when used, enable client applications to trust the integrity of the server. However, the servers would not be able to check whether the client applications have been tampered with. As such, these servers may send an authentication request to application 102, which has been configured as an application, requesting that application 102 authenticates itself using secure module 112 as described above prior to the exchange of data between application 102 and the server.

In certain embodiments of the invention, there is the need for application 102 to trust the integrity of application 104 and similarly, for application 104 to trust the integrity of application 102 whereby information is only exchanged when mutual trust is established between these two applications. In such a scenario, application 102 will be configured to utilize secure module 112 to authenticate its integrity (as described in the sections above) while application 104 will be configured to utilize secure module 114 to attest for its integrity. It should be noted that secure module 114 may be configured to perform the similar functions as secure module 112.

Figure 2:
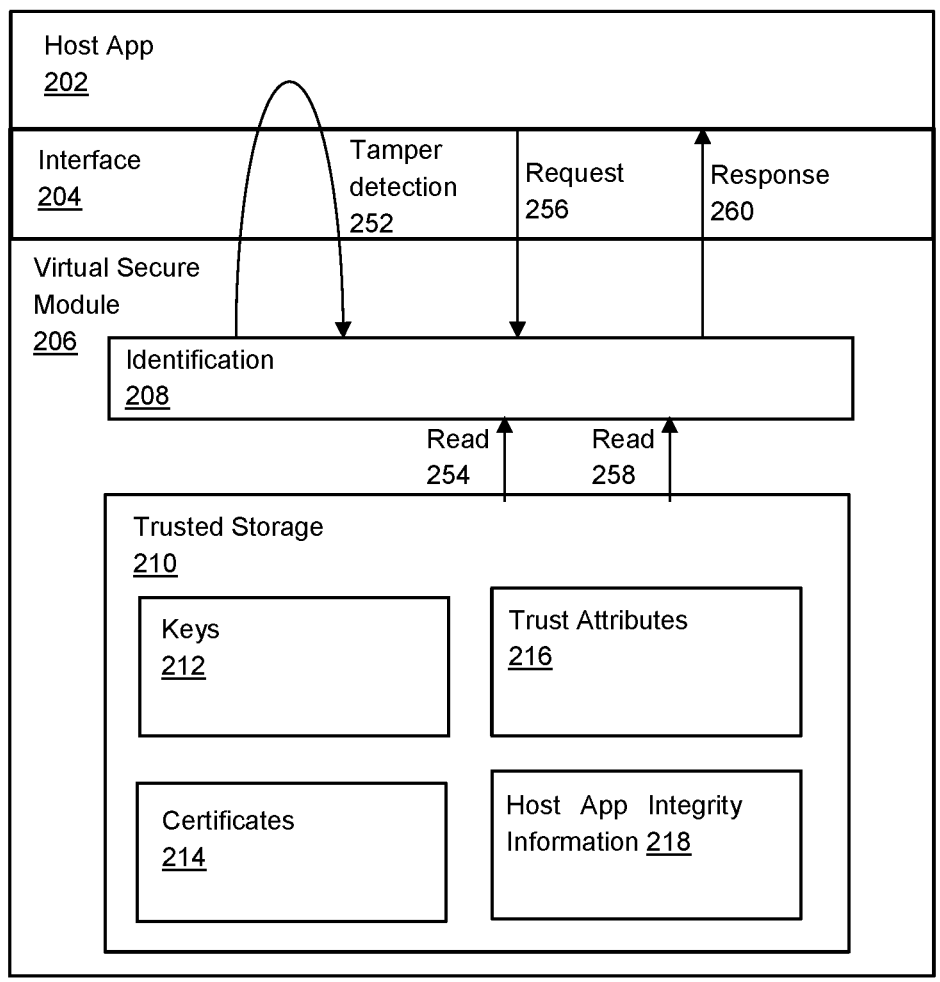
FIG. 2 illustrating a block diagram of a virtual secure module that is communicatively coupled to a host application in accordance with embodiments of the invention.

In accordance with embodiments of the invention, secure module 112 may comprise a virtual or a software module embedded within an application. The virtual secure module may then be loaded when the application is loaded, and when communication is established between the virtual secure module and the application. An exemplary block diagram showing the interaction between the virtual secure module and the application is illustrated in FIG. 2. In particular, FIG. 2 illustrates virtual secure module 206 that is embedded within host application 202 through interface 204. Virtual secure module 206 is provided with identification module 208 that is configured to establish cryptographic bonds between host application 202 and virtual secure module 206 when communication is established between them or in accordance to a dynamic schedule. The cryptographic bonds may be generated based on information associated with the application as preloaded in trusted storage module 210 and on information obtained directly from the application.

In particular, identification module 208 may be configured to initiate a tamper detection process at step 252 to authenticate the integrity of host application 202 based on the information obtained from application 202 and information stored in host app integrity information module 218 as read at step 254. Once authenticated, application 202 may then request at step 256 for certain actions to be processed and/or performed by trusted storage module 210 at step 258. Among the actions that may be performed/processed include the retrieval of private keys 212, certificates 214 and/or trust attributes 216 associated with host application 202. Once processed, the processed actions are then sent as responses from module 206 to application 202 at step 260.

Figure 3:
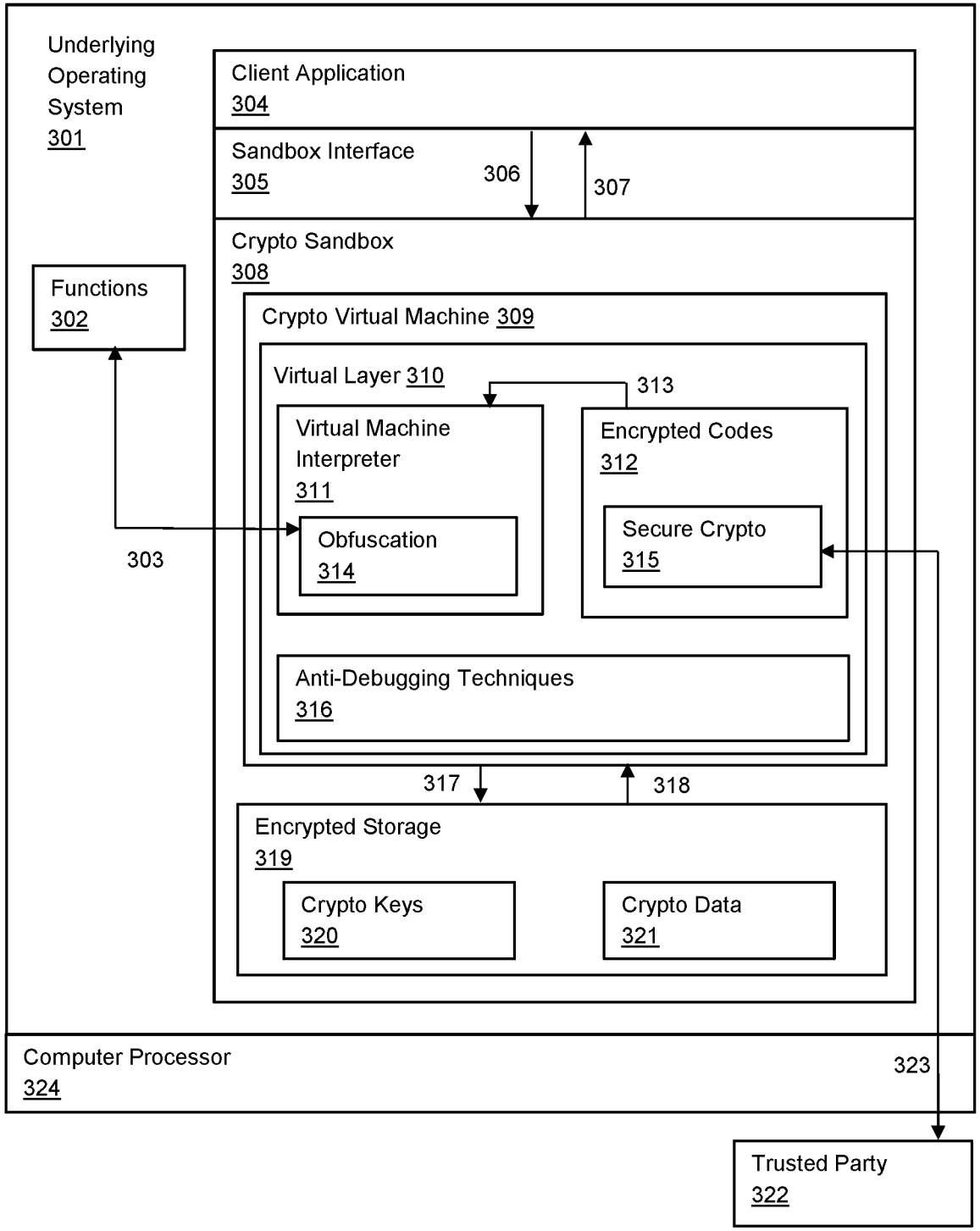
FIG. 3 illustrating a block diagram representative of computing modules provided within the virtual secure module illustrated in FIG. 2 in accordance with embodiments of the invention.

In embodiments of the invention, virtual secure module 206 may be implemented as a crypto virtual machine as illustrated in FIG. 3. In this embodiment, a cryptographic sandbox 308 provides a method for securely storing and processing cryptographic keys and data for an application 304, with a tamper-proof virtual layer 310 provided within the sandbox to protect the processing and data from unauthorised observers. The cryptographic sandbox 308 may comprise a cryptographic virtual machine 309 configured as a secure virtual processor as well as a secure virtual storage 319 in order to allow the application 304 to both perform secure processing as well as secure storage. Cryptographic keys 320 and data 321 may be securely stored in storage 319.

The cryptographic virtual machine may include a secure cryptographic module 315 to perform cryptographic operations, including storing, retrieving, and processing the cryptographic keys and data. These cryptographic operations may include publicly available cryptographic routines, including symmetric key cryptography such as AES, asymmetric key cryptographic such as RSA, hashing functions such as SHA-1, SHA-2, and HMAC, as well as pseudo-random number generation and key generation functions. This virtual machine may receive requests 306 from the application to perform these cryptographic operations by securely processing these cryptographic operations within the virtual machine and sending the results of these cryptographic operations as a response 307 back to the application. This virtual machine may also be used to perform other non-cryptographic but security-critical processing functions.

The virtual machine 309 may comprise a virtual machine interpreter 311 and a set of virtual machine codes 312. The virtual machine and underlying operating system 301 may be executed on a computer processor 324. The virtual machine interpreter may further include obfuscation techniques 314 to obscure its operations from the underlying operating system and any unauthorised observers therein. The virtual machine may provide a means for secure encrypted storage 319 of cryptographic keys and data within the virtual machine. The secure storage may additionally be used to store other non-cryptographic but security-critical data. This means may be provided by writing 317 to and reading 318 from the encrypted storage. This encrypted file may be stored within the operating system's file system or within a trusted storage provided by the operating system.

The application may send the request to the virtual machine and receive the results of the cryptographic operations from the virtual machine through a sandbox interface 305. The interface may comprise either a programming interface such as a software library or a network interface such as a TCP/IP network connection.

The virtual machine interpreter may also provide a function 323 to securely update the set of virtual machine codes from a trusted party 322. The codes may be signed by the trusted party and verified by the virtual machine before the updating process is allowed to replace the set of virtual machine codes used by the virtual machine. The virtual machine interpreter may provide secure access 303 to functions 302 in the underlying operating system.

The tamper-proof virtual layer 310 may protect the virtual machine from reverse engineering by storing the identification module (of FIG. 2) that is implemented as a set of virtual machine codes in an encrypted form, and decrypting these instructions at runtime to allow normal operation of the virtual machine. The tamper-proof virtual layer may protect the virtual machine from runtime analysis by employing techniques 316 to prevent debugging of the virtual machine. These techniques may include a technique to prevent a debugger from being attached to the virtual machine.

Alternatively, the secure module may comprise a hardware secure element that is delivered to a user together with the application. In embodiments of the invention, the application may be configured to run within an operating system provided within the hardware secure element, e.g. as an applet, or may be configured to function only when communication is established between the application and the hardware secure element. Such an embodiment is illustrated in FIG. 4 which shows the interaction between hardware secure element 410 and host application 404.

Figure 4:
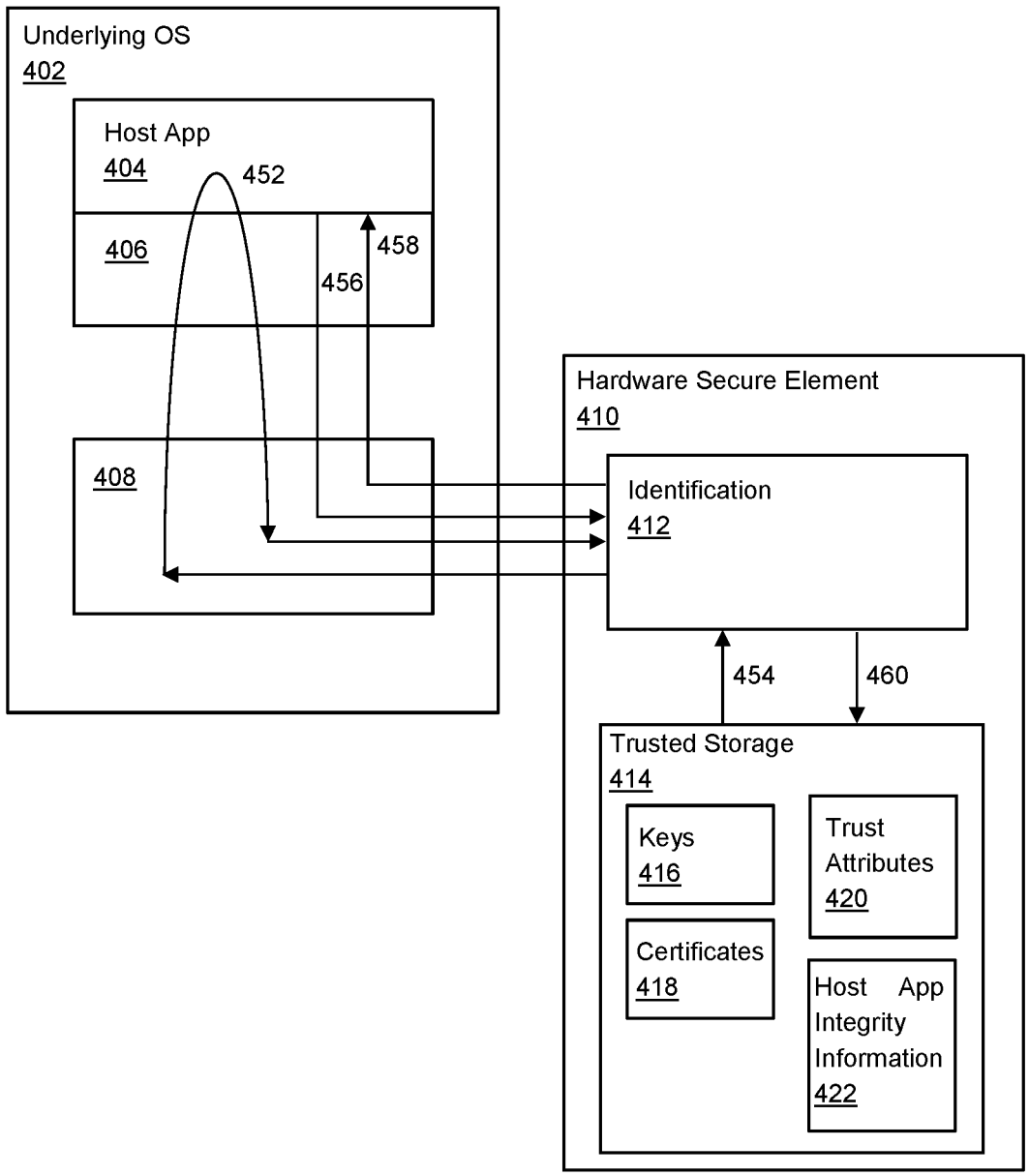
FIG. 4 illustrating a block diagram of a hardware secure module that is communicatively coupled to a host application in accordance with embodiments of the invention.

In particular, FIG. 4 illustrates hardware secure element 410 that is communicatively connected to host application 404, which is installed in underlying operating system 402 of a computing device, through interface 406 and driver 408. The communication may be through wired and/or wireless means and is left as a design choice to one skilled in the art. As shown, hardware secure element 410 is provided with identification module 412 that is configured to establish cryptographic bonds between host application 404 and hardware secure element 410 when communication is established between them or in accordance to a dynamic schedule. The cryptographic bonds may be generated based on information associated with the application as preloaded in trusted storage module 414 and on information obtained directly from the application.

In particular, identification module 412 may be configured to initiate a tamper detection process at step 452 to authenticate the integrity of host application 404 based on the information obtained from application 404 and information stored in trusted storage 414 as read at step 454. Once authenticated, application 404 may then request at step 456 for certain actions to be processed at step 460 by trusted storage module 414. Among the actions that may be processed include the retrieval of private keys 416, certificates 418 and/or trust attributes 420 associated with host application 404. Once processed, the processed actions are then sent as responses from hardware secure element 410 to application 404 at step 458.

Figure 5:
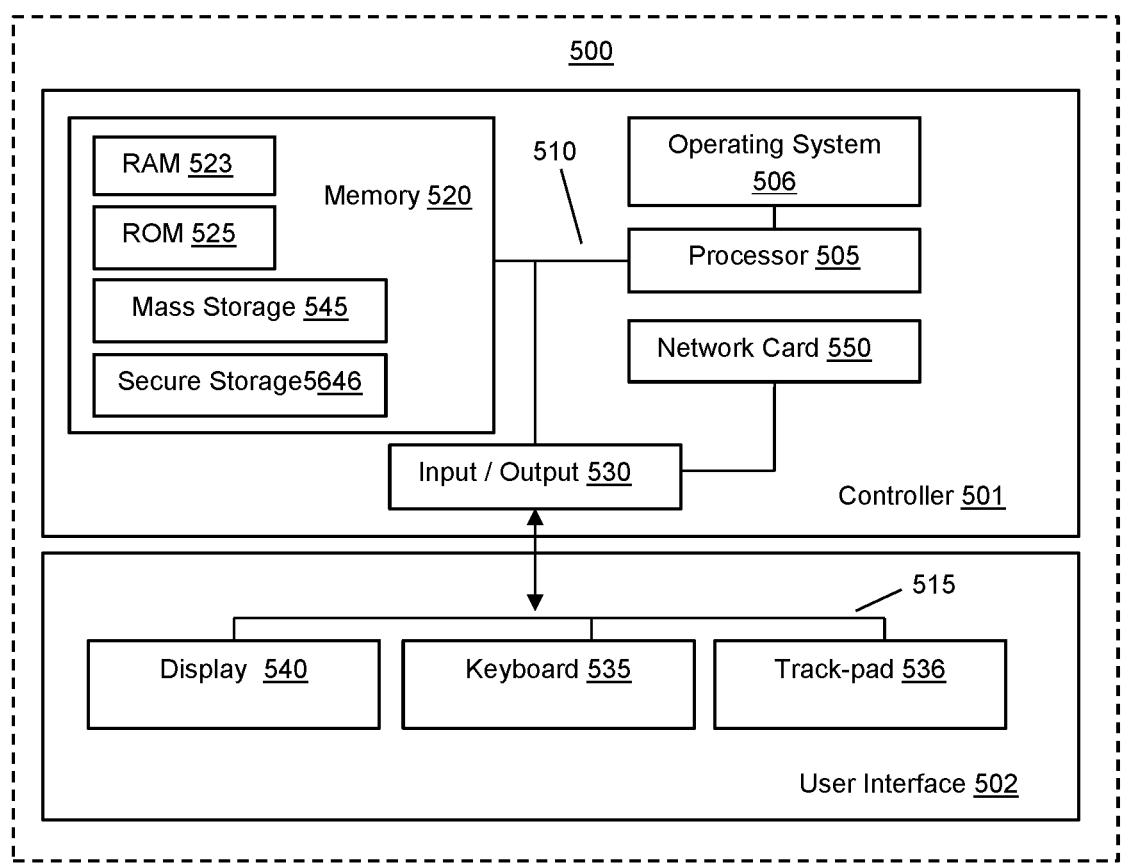
FIG. 5 illustrating a block diagram representative of components of a processing system configured as the hardware secure module illustrated in FIG. 4 in accordance with embodiments of the invention.

In accordance with embodiments of the invention, a block diagram representative of components of processing system 500 that may be provided within hardware secure element 410 for implementing embodiments in accordance with embodiments of the invention is illustrated in FIG. 5. One skilled in the art will recognize that the exact configuration of each processing system provided within these modules may be different and the exact configuration of processing system 500 may vary and FIG. 5 is provided by way of example only.

In embodiments of the invention, hardware secure element 410 may comprise controller 501 and user interface 502. User interface 502 is arranged to enable manual interactions between a user and the modules provided within hardware secure element 410 as required, and for this purpose includes the input/output components required for the user to enter instructions to provide updates to each of these modules. A person skilled in the art will recognize that components of user interface 502 may vary from embodiment to embodiment but will typically include one or more of display 540, keyboard 535 and track-pad 536.

Controller 501 is in data communication with user interface 502 via bus 515 and includes memory 520, processor 505 mounted on a circuit board that processes instructions and data for performing the method of this embodiment, an operating system 506, an input/output (I/O) interface 530 for communicating with user interface 502 and a communications interface, in this embodiment in the form of a network card 550. Network card 550 may, for example, be utilized to send data from these modules via a wired or wireless network to other processing devices that contain host applications or to receive data via the wired or wireless network. Wireless networks that may be utilized by network card 550 include, but are not limited to, Wireless-Fidelity (Wi-Fi), Bluetooth, Near Field Communication (NFC), cellular networks, satellite networks, telecommunication networks, Wide Area Networks (WAN) and etc.

Memory 520 and operating system 506 are in data communication with CPU 505 via bus 510. The memory components include both volatile and non-volatile memory and more than one of each type of memory, including Random Access Memory (RAM) 520, Read Only Memory (ROM) 525 and a mass storage device 545, the last comprising one or more solid-state drives (SSDs). Memory 520 also includes secure storage 546 for securely storing secret keys, or private keys. One skilled in the art will recognize that the memory components described above comprise non-transitory computer-readable media and shall be taken to comprise all computer-readable media except for a transitory, propagating signal. Typically, the instructions are stored as program code in the memory components but can also be hardwired. Memory 520 may include a kernel and/or programming modules such as a software application that may be stored in either volatile or non-volatile memory.

Herein the term "processor" is used to refer generically to any device or component that can process such instructions and may include: a microprocessor, microcontroller, programmable logic device or other computational device. That is, processor 505 may be provided by any suitable logic circuitry for receiving inputs, processing them in accordance with instructions stored in memory and generating outputs (for example to the memory components or on display 540). In this embodiment, processor 505 may be a single core or multi-core processor with memory addressable space. In one example, processor 505 may be multi-core, comprising—for example—an 8 core CPU. In another example, it could be a cluster of CPU cores operating in parallel to accelerate computations.

Figure 6:
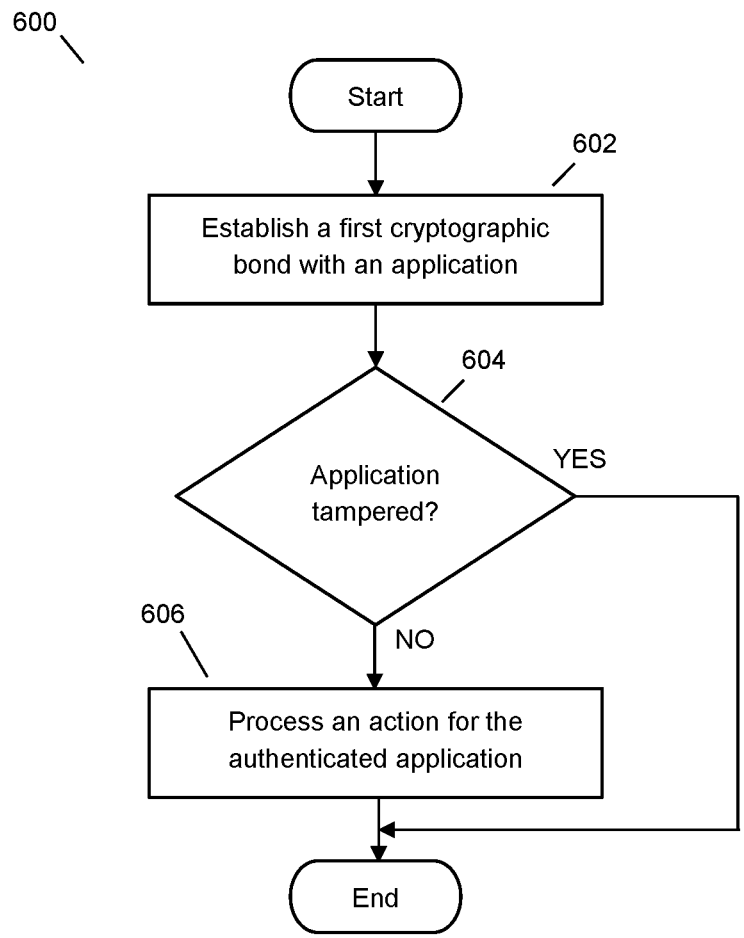
FIG. 6 illustrating a process which is implemented in a secure module for attesting an authenticity of an application installed within a standard operating system of a computing device in accordance with embodiments of the invention.

FIG. 6 illustrates process 600 which is implemented in a secure module for attesting an authenticity of an application installed within a standard operating system of a computing device in accordance with embodiments of the invention.

Process 600 begins at step 602 whereby process 600 establishes a cryptographic bond between the application and the secure module when communication is established between the application and the secure module. It should be noted that the application may be used to receive/transmit actions, data and/or requests from/to other applications and the received/transmitted information may then be provided to or obtained from the secure module. Process 600 may generate the cryptographic bond based on information associated with the application as preloaded in the secure module and on information obtained directly from the application. Process 600 then determines at step 604 whether the application has been tampered with based on the information contained in the cryptographic bond. If process 600 determines that the application has been tampered within, process 600 then ends and terminates the communication between the application and the secure module, preventing any data from being exchanged between them.

Conversely, if process 600 determines from the information contained in the cryptographic bond that the application has not been tampered with, process 600 then proceeds to step 606. At step 606, process 600 will process an action for the authenticated application. In an embodiment of the invention, the process at 606 may include signing (using a cryptographic key-signing system) the action using a private key unique to the authenticated application; and sending the signed action and a retrieved certificate chain to another application that is in communication with the authenticated application, whereby upon receiving the signed action and the certificate chain, the another application is configured to verify the signed action based on the received certificate chain and a digital signature associated with the application.

In another embodiment of the invention, the process may include verifying an action received from another application, wherein the action comprises a signed request (which contains instructions and a transaction) and a certificate chain whereby the request was signed using another secure module linked to the another application. In an embodiment of the invention, the instructions contained within the signed request may instruct the secure module to sign the transaction contained within the request using a private key unique to the application once the request has been validated. In other embodiments of the invention, the instructions contained within the signed request may instruct the secure module to provide information stored within the secure module such as, but not limited to, identity keys, the application user's identity, private keys, digital certificates, and/or trust attributes. In order to verify the action, the secure module will validate the veracity of the signed request using the certificate chain that was provided with the action.

Once the veracity of the signed request is validated, the instructions contained within the request will then be carried out. For example, if the instructions are for the secure module to sign the transaction, this will then be done using a private key belonging to the secure module and that is unique to the authenticated application. Similarly, in another example, if the instructions are for the secure module to provide information stored within the secure module, this will be done once the request is validated.

A corresponding response is constructed based on the outcome of the instructions that were carried out and the response is then signed using another private key that is also unique to the application. The signed response is then encrypted before the encrypted signed response is provided to the authenticated application linked to the secure element which then goes on to provide the encrypted signed response to the application from which the action originated from.

In further embodiments of the invention, the process may include retrieving a trust attribute from the trusted-storage module based on requirements of the action. The trust attribute would have been signed by a trusted third party, i.e. the third party that issued the certificate for the application's public key. In other words, this implies that the trusted third party trusts the application that is linked with the trusted-storage module, and that the trusted third party has verified, through some means (e.g., a formal certification process), that the application deserves the trust attribute's stamp of approval for a certain purpose (e.g., for secure user authentication). A response may then be generated based on the trust attribute; and would be sent to another application. When the application receives the trust attribute, the application will recognize that the trust attribute is unique to the application that owned the corresponding private key and that the trusted third party had previously vouched for the integrity of the application that sent the trust attribute.

One-Sided Trust Example

With reference to FIG. 1, there may arise a situation whereby application 104 may need to trust application 102, but application 102 does not need to trust application 104. Such a situation will arise when one application needs to depend on another application to perform a user authentication process. Such a situation may also arise when a client application calls a server application's API with data that needs to be signed so that the server application trusts that the client application has not been tampered with.

In these situations of one-sided trust, only one of the applications are required to be bound to a secure module.

In this implementation, only application 102 is bound to secure module 112, and application 104 trusts application 102's root certification authority. The detailed flow between application 102 and 104 to establish the one-sided trust is described as follows:

Step 1: Application 104 initiates the request and sends the request to application 102

Step 2: Application 102 processes the request and constructs the corresponding response Step 3: Application 102 signs the response using the secure module Step 4: Application 102 sends the signed response together with the certificate chain to application 104

Step 5: Application 104 verifies the received signed response and the certificate chain Mutual Trust Example There may also arise situations whereby both applications need to mutually trust each other. An example is when one application needs to send confidential data to another application. The first application should only send data if the other application can be trusted, whereas the second application can only trust the integrity of the received data if the first app can be trusted.

In this implementation, (with reference to FIG. 1) both application 102 and application 104 are both bound to their respective secure modules, i.e. 112 and 114 respectively, and both applications trust each other's root certification authority. The detailed flow between application 102 and 104 to establish the mutual trust is described as follows:

Step 1: Application 102 initiates the request

Step 2: Application 102 signs the request using the secure module 112

Step 3: Application 102 sends the signed request together with the certificate chain to application 104

Step 4: Application 104 verifies the signed request and the certificate chain Step 5: Application 104 processes the request and constructs the corresponding response Step 6: Application 104 signs the response using the secure module 114

Step 7: Application 104 encrypts the signed response using the public key from application 102

Step 8: Application 104 sends the encrypted signed response together with the certificate chain to application 102

Step 9: Application 102 decrypts the encrypted signed response using the secure module 112

Step 10: Application 102 verifies the signed response and the certificate chain In addition to the two examples described above, secure module 112/114 may be utilized in many other use cases such as an authentication use case, a trusted API call use case, a trusted data transfer use case, a payment use case and a delegation of data processing use case.

In particular, in the authentication use case, in a smartphone, an application A is designed to trust any application B to authenticate the user as long as application B contains trust attributes that indicate that it can authenticate users at Authenticator Assurance Level 3 (AAL3). Application B can use its app-bound secure module to provide the signed authentication result together with the AAL3 trust attribute.

As for the trusted API call use case, open banking APIs need to ensure that the clients are trusted and are not tampered with so that users do not unintentionally divulge private financial information to malware. Such security can be achieved if each client application can only connect to the open banking APIs if the client application has an app-bound secure module that can provide signed requests together with a trust attribute that attests its suitability for use as an open banking application.

In an exemplary situation of a trusted data transfer use case, application A needs to transfer some confidential data to application B for processing and to receive the processed result securely. Both application can make use of their app-bound secure modules to establish a key for secure channel and to verify each other's integrity.

In an exemplary situation of a payment use-case, application A is an e-commerce application whereas application B can be a banking or payment wallet application. When user wants to checkout a shopping cart in application A, he chooses a certain application B for payment. Both applications will need to establish mutual trust with each other through the mutual sharing of their trust attributes in their respective app-bound secure modules. A secure channel can also be established and each application can be assured that the other application has not been tampered with and that the applications have valid trust attributes for e-commerce application and payment application respectively.

Finally, in an exemplary situation of a delegation of data processing use case, application A is configured to contain a user's private financial data. When the user wants to provide this data to a trusted financial advisory application B so as to obtain some financial insights, before sharing the user's data, application A verifies via application B's app-bound secure module that it contains a trust attribute for financial data privacy and that it has not been tampered with. Application A then proceeds to establish a secure channel with application B to exchange data accordingly.

Numerous other changes, substitutions, variations and modifications may be ascertained by one skilled in the art and it is intended that the present invention encompass all such changes, substitutions, variations and modifications as falling within the scope of the appended claims.

The invention claimed is:

1. A secure module for attesting an authenticity of an application that is provided within a standard operating system of a computing device, the secure module comprising:
   an identification module, implemented using one or more processors or a memory, communicatively connected to the application, the identification module being configured to:
   establish a first cryptographic bond between the application and the secure module when communication is established between the application and the secure module, whereby the first cryptographic bond is generated based on information associated with the application as preloaded in the secure module and on information obtained from the application;
   authenticate an integrity of the application based on the first cryptographic bond by verifying integrity of the application based on the information used to generate the first cryptographic bond;
   process an action for the authenticated application when the integrity of the application has been authenticated; and
   wherein the secure module further comprises: a non-transitory media readable by a processing unit to store instructions for directing the processing unit to: provide a cryptographic sandbox that includes a virtual cryptographic machine that performs cryptographic operations including decrypting virtual machine codes, and a tamper-proof virtual layer within the cryptographic sandbox to protect cryptographic operations from unauthorized observers.

2. The module according to claim 1 wherein the identification module is further configured to dynamically re-authenticate the integrity of the authenticated application based on a second cryptographic bond, wherein the second cryptographic bond is generated based on the information associated with the application as preloaded in the secure module and on information newly obtained from the application, and process further actions for the application when the integrity of the application has been re-authenticated.

3. The module according to claim 1 wherein the establishing of the first cryptographic bond between the application and the secure module by the identification module comprises:
   the identification module being configured to:
   receive an app-checksum from the application, wherein the app-checksum is derived from the application based on the application's source code, the application's binary and/or the application's programming flow;
   retrieve a trusted-checksum associated with the application from a trusted-storage module provided in the secure module; and
   generate the first cryptographic bond based on the app-checksum received from the application and the retrieved trusted-checksum.

4. The module according to claim 3 wherein the generation of the app-checksum by the application comprises the application being configured to utilize a SHA-256 hash function to hash the source code of the application to generate the app-checksum.

5. The module according to claim 1 wherein the establishing of the first cryptographic bond between the application and the secure module by the identification module comprises:
the identification module being configured to:
receive from the application a digital signature associated with the application, wherein the digital signature is generated when the application's source code is signed using a private key unique to the application each time the application's source code is compiled;
retrieve a trusted-public key associated with the application from a trusted-storage module provided in the secure module; and
generate the first cryptographic bond based on the digital signature received from the application and the retrieved trusted-public key associated with the application.

6. The module according to claim 5 wherein the identification module is further configured to:
receive an app-checksum from the application, wherein the app-checksum is derived from the application based on the application's source code;
retrieve a trusted-checksum associated with the application from a trusted-storage module provided in the secure module; and
re-generate the first cryptographic bond based on the app-checksum received from the application, the retrieved trusted-checksum, the received digital signature and the retrieved trusted-public key.

7. The module according to claim 3 wherein the authentication of the integrity of the application based on the first cryptographic bond by the identification node comprises the identification node being configured to authenticate the integrity of the application when it is determined from the cryptographic bond that information obtained from the application matches with the information associated with the application as preloaded in the secure module.

8. The module according to claim 5 wherein the processing of the action for the authenticated application by the identification module comprises:
the identification module being configured to:
sign, using a cryptographic key-signing algorithm, the action using a private key unique to the application; and
communicate the signed action and a retrieved certificate chain to another application, whereby upon receiving the signed action and the certificate chain, the another application is configured to verify the signed action based on the received certificate chain.

9. The module according to claim 5 wherein the action comprises a request signed by another application and a certificate chain, whereby the processing of the action for the authenticated application by the identification module comprises:
the identification module being configured to:
verify the signed request based on the certificate chain;
execute instructions contained within the request when it is determined that the signed request has been verified;
construct a response based on an outcome of the executed instructions;
sign the response using a private key unique to the application;
encrypt the signed response and communicate the encrypted signed response to the another application.

10. The module according to claim 1 wherein the processing of the action for the authenticated application by the identification module comprises:
the identification module being configured to:
retrieve a trust attribute from a trusted-storage module provided within the secure module based on requirements of the action, and where the trust attribute is signed by a trusted third party that has certified that the application is qualified to be given the attribute;
generate a response based on the retrieved trust attribute; and
send the generated response to another application, wherein upon receiving the generated response, the another application is configured to use the trust attribute contained within the response to perform a secure transaction.

11. A system for establishing, using the secure module according to claim 1, mutual trust between a first computing-application and a second computing-application that are provided within a standard operating system of a user's computing device, wherein the application comprises the first computing-application, and whereby the secure module is communicatively connected to the first computing-application, the system comprising:
the second computing-application being configured to send an authentication request to the first computing-application;
the first computing-application being configured to:
authenticate, using the secure module, the first computing-application when the authentication request from the second computing-application is received by the first computing-application;
generate a verification response when the first computing-application has been authenticated by the secure module; and
send the verification response to the second computing-application, wherein the second computing-application is configured to use the verification response to establish the mutual trust between the first and second computing-applications.

12. The system according to claim 11 wherein the second computing-application is configured to:
share secure data with the first computing-application when the second computing-application determines from the received verification response that the first computing-application has been authenticated.

13. A system for establishing, using the secure module according to claim 1, mutual trust between a third computing-application and a trust element bound to a user's computing device, the third computing-application being provided within a standard operating system of the user's computing device, wherein the application comprises the third computing-application, and whereby the secure module is communicatively connected to the third computing-application, the system comprising:
the trust element being configured to send an authentication request to the third computing-application;
the third computing-application being configured to:
authenticate, using the secure module, the third computing-application when the authentication request from the trust element is received by the third computing-application;
generate a verification response when the third computing-application has been authenticated by the secure module; and send the verification response to the trust element, wherein the trust element is configured to use the verification response to establish the mutual trust between the third computing-application and the trust element.

14. A system for establishing, using the secure module according to claim 1, mutual trust between a fourth computing-application and a fifth computing-application, the fourth computing-application being provided within a standard operating system of the user's computing device, wherein the application comprises the fourth computing-application, and whereby the secure module is communicatively connected to the fourth computing-application, the system comprising:
the fifth computing-application being configured to send an authentication request to the fourth computing-application;
the fourth computing-application being configured to:
authenticate, using the secure module, the fourth computing-application when the authentication request from the fifth computing-application is received by the fourth computing-application;
generate a verification response when the fourth computing-application has been authenticated by the secure module; and
send the verification response to the fifth computing-application, wherein the fifth computing-application is configured to use the verification response to establish the mutual trust between the fourth computing-application and the fifth computing-application.

15. A computer implemented method using one or more processors, for attesting an authenticity of an application provided within standard operating system of a computing device,
the method comprising the steps of:
establishing, using a secure module, a first cryptographic bond between the application and the secure module when communication is established between the application and the secure nodule, whereby the first cryptographic bond is generated based on information associated with the application as preloaded in the secure module and on information obtained from the application;
authenticating, using the secure module, an integrity of the application based on the first cryptographic bond by verifying integrity of the application based on the information used to generate the first cryptographic bond;
processing, using the secure module, an action for the authenticated application when the integrity of the application has been authenticated; and
wherein the secure module comprises: a non-transitory media readable by a processing unit to store instructions for directing the processing unit to: provide a cryptographic sandbox that includes a virtual cryptographic machine that performs cryptographic operations including decrypting virtual machine codes, and a tamper-proof virtual layer within the cryptographic sandbox to protect cryptographic operations from unauthorized observers.

16. The method according to claim 15 wherein the method further comprises the step of: dynamically re-authenticating, using the secure module, the integrity of the authenticated application based on a second cryptographic bond, wherein the second cryptographic bond is generated based on the information associated with the application as preloaded in the secure module and on information newly obtained from the application, and process further actions for the application when the integrity of the application has been re-authenticated.

17. The method according to claim 15 wherein the step of establishing the first cryptographic bond between the application and the secure module comprises the steps of:
receiving, using the secure module, an app-checksum from the application, wherein the app-checksum is derived from the application based on the application's source code, the application's binary and/or the application's programming flow;
retrieving, using the secure module, a trusted-checksum associated with the application from a trusted-storage module provided in the secure module; and
generating, using the secure module, the first cryptographic bond based on the app-checksum received from the application and the retrieved trusted-checksum.

18. The method according to claim 17 wherein the generation of the app-checksum by the application comprises the application being configured to utilize a SHA-256 hash function to hash the source code of the application to generate the app-checksum.

* * * * *